United States Patent
Kehn

(10) Patent No.: US 10,618,018 B2
(45) Date of Patent: Apr. 14, 2020

(54) LOW WEAR RADIAL FLOW IMPELLER DEVICE AND SYSTEM

(71) Applicant: SPX FLOW, INC., Charlotte, NC (US)

(72) Inventor: Richard Kehn, Avon, NY (US)

(73) Assignee: SPX Flow, Inc., Charlotte, NC (US)

( * ) Notice: Subject to any disclaimer, the term of this patent is extended or adjusted under 35 U.S.C. 154(b) by 532 days.

(21) Appl. No.: 15/164,349

(22) Filed: May 25, 2016

(65) Prior Publication Data
US 2017/0343005 A1    Nov. 30, 2017

(51) Int. Cl.
| | |
|---|---|
| *B01F 7/00* | (2006.01) |
| *F04D 29/24* | (2006.01) |
| *F04D 29/66* | (2006.01) |
| *B01J 19/00* | (2006.01) |
| *F04D 29/043* | (2006.01) |
| *F04D 29/22* | (2006.01) |

(52) U.S. Cl.
CPC ....... *B01F 7/00383* (2013.01); *B01J 19/0066* (2013.01); *F04D 29/043* (2013.01); *F04D 29/22* (2013.01); *F04D 29/242* (2013.01); *F04D 29/669* (2013.01); *B01F 2215/0431* (2013.01); *F05D 2250/72* (2013.01); *F05D 2250/75* (2013.01)

(58) Field of Classification Search
None
See application file for complete search history.

(56) References Cited

U.S. PATENT DOCUMENTS

| | | | |
|---|---|---|---|
| 4,305,673 A | 12/1981 | Herbst | |
| 4,779,990 A | 10/1988 | Hjort et al. | |
| 5,198,156 A | 3/1993 | Middelton et al. | |
| 5,813,837 A | 9/1998 | Yamamoto et al. | |
| 6,190,033 B1 | 2/2001 | Rickman et al. | |
| 9,683,208 B2 * | 6/2017 | Stadler | C12M 23/14 |
| 2008/0199321 A1 | 8/2008 | Gigas et al. | |
| 2009/0231952 A1 | 9/2009 | Higbee et al. | |
| 2014/0071788 A1 * | 3/2014 | Wang | B01F 7/00016 366/279 |
| 2017/0029758 A1 * | 2/2017 | Stadler | C12M 23/14 |

FOREIGN PATENT DOCUMENTS

EP     1776999 A1    4/2007

OTHER PUBLICATIONS

Yuyun Bao et al., "Influence of the Top Impeller Diameter on the Gas Dispersion in a Sparged Multi-impeller Stirred Tank," Industrial & Engineering Chemistry Research, vol. 51, No. 38, Aug. 29, 2012, pp. 12411-12420, XP055404852.

\* cited by examiner

*Primary Examiner* — Christopher Verdier
*Assistant Examiner* — Juan G Flores
(74) *Attorney, Agent, or Firm* — BakerHostetler

(57) ABSTRACT

A radial impeller includes a hub, a disk, and a plurality of blades. The disk is affixed to the hub. The disk has a disk plane defined by the disk. Each blade of the plurality of blades is affixed to the disk. Each blade includes a "C" shaped body portion and an upper and lower horizontal extension. The upper horizontal extension extends along an upper plane parallel to the disk plane. The lower horizontal extension extends along a lower plane parallel to the disk plane.

20 Claims, 7 Drawing Sheets

LOW WEAR RADIAL FLOW IMPELLER DEVICE AND SYSTEM

FIELD OF THE INVENTION

The present disclosure generally relates to an impeller. More particularly, the present disclosure pertains to a radial flow impeller configured to reduce wear.

BACKGROUND

It is generally known that impellers are utilized to keep fluids mixed and/or particulates in suspension when stored in containers. Typically, the impeller is placed relatively close to the bottom of the container to aid in mixing and to allow for mixing as the container becomes empty. In particular, radial flow impellers are placed in proximity to the bottom of the container to generate an outward flow of fluid along the bottom of the container that is deflected upwards by the side walls of the container to develop a toroidal mixing flow. Due a variety of factors, radial flow impellers may be more likely to sustain wear in comparison to axial flow impellers. Examples of factors that may influence the wear include turbulent flow and/or cavitation around the blades of the radial flow impeller and the use of radial flow impellers to suspend slurries with high solid content. Accordingly, it is desirable to provide a radial flow impeller that is capable of overcoming the disadvantages described herein at least to some extent.

SUMMARY

The foregoing needs are met, to a great extent, by embodiments the present disclosure, wherein in one respect a radial flow impeller is provided that is configured to reduce wear.

An embodiment relates to a radial impeller. The radial impeller includes a hub, a disk, and a plurality of blades. The disk is affixed to the hub. The disk has a disk plane defined by the disk. Each blade of the plurality of blades is affixed to the disk. Each blade includes a "C" shaped body portion and an upper and lower horizontal extension. The "C" shaped body portion has a blade length, a trailing portion, an upper leading edge, and a lower leading edge. The trailing portion of the "C" shaped body portion extending along a first straight line from a root of the respective blade to a tip of the respective blade. The upper leading edge of the "C" shaped body portion extending along a second straight line and having the blade length. The lower leading edge of the "C" shaped body portion extending along a third straight line and having the blade length. The upper horizontal extension is defined by an upper planar surface extending along an upper plane parallel to the disk plane. The upper horizontal extension is the blade length and extends along the upper leading edge. The lower horizontal extension is defined by a lower planar surface extending along a lower plane parallel to the disk plane. The lower horizontal extension is the blade length and extends along the lower leading edge.

Another embodiment pertains to a radial impeller assembly. The radial impeller assembly includes a shaft having a first end and a second end, a connection to receive torque disposed at the first end, and a radial impeller. The radial impeller is disposed at the second end and includes a hub, a disk, and a plurality of blades. The disk is affixed to the hub. The disk has a disk plane defined by the disk. Each blade of the plurality of blades is affixed to the disk. Each blade includes a "C" shaped body portion and an upper and lower horizontal extension. The upper horizontal extension extends along an upper plane parallel to the disk plane. The lower horizontal extension extends along a lower plane parallel to the disk plane.

Yet another embodiment relates to a radial impeller mixing system. The radial impeller mixing system include a container, a motor, and a radial impeller assembly. The container has an access port disposed on an upper surface thereof. The radial impeller assembly includes a shaft having a first end and a second end, a radial impeller, and a connection to receive torque from the motor. The connection is disposed at the first end. The radial impeller is disposed at the second end and includes a hub, a disk, and a plurality of blades. The disk is affixed to the hub. The disk has a disk plane defined by the disk. Each blade of the plurality of blades is affixed to the disk. Each blade includes a "C" shaped body portion and an upper and lower horizontal extension. The upper horizontal extension extends along an upper plane parallel to the disk plane. The lower horizontal extension extends along a lower plane parallel to the disk plane.

There has thus been outlined, rather broadly, certain embodiments of the disclosure in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that the disclosure is not limited in its application to the details of construction and to the arrangements of the components set forth in the following description or illustrated in the drawings. The disclosed device and method is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various embodiments. It is important, therefore, that the claims be regarded as including such equivalent constructions insofar as they do not depart from the spirit and scope of the various embodiments.

DETAILED DESCRIPTION OF THE PREFERRED EMBODIMENT

Various aspects of the impeller described herein are suitable for use with a mixing apparatus and particularly to an apparatus for the mixing of liquids and liquid suspensions of solids and gases contained in vessels. More particularly, some aspects of the impeller described herein are suitable for use in mixing equipment for chemical processes and may be suitable for use with mixers for solid suspensions under gassed conditions.

Some aspects of the radial impeller described herein may be configured to reduce wear of the radial impeller in comparison to convention impellers operating at the same rotational speed, tip speed, and/or power input to the fluid or suspension. It is an advantage that some aspects described herein may improve efficiency such that rotational speed and/or tip speed may be reduced while achieving the same power input to the fluid or suspension. In this manner, for a given input of power, the rotational speed and/or the tip speed of the radial impeller described herein may be reduced relative to a conventional radial impeller and this may further reduce wear of the radial impeller described herein. For example, impeller wear is a function of the tip speed cubed (tip speed$^3$). As such, even small decreases in tip speed may greatly improve impeller wear.

Figure 1:
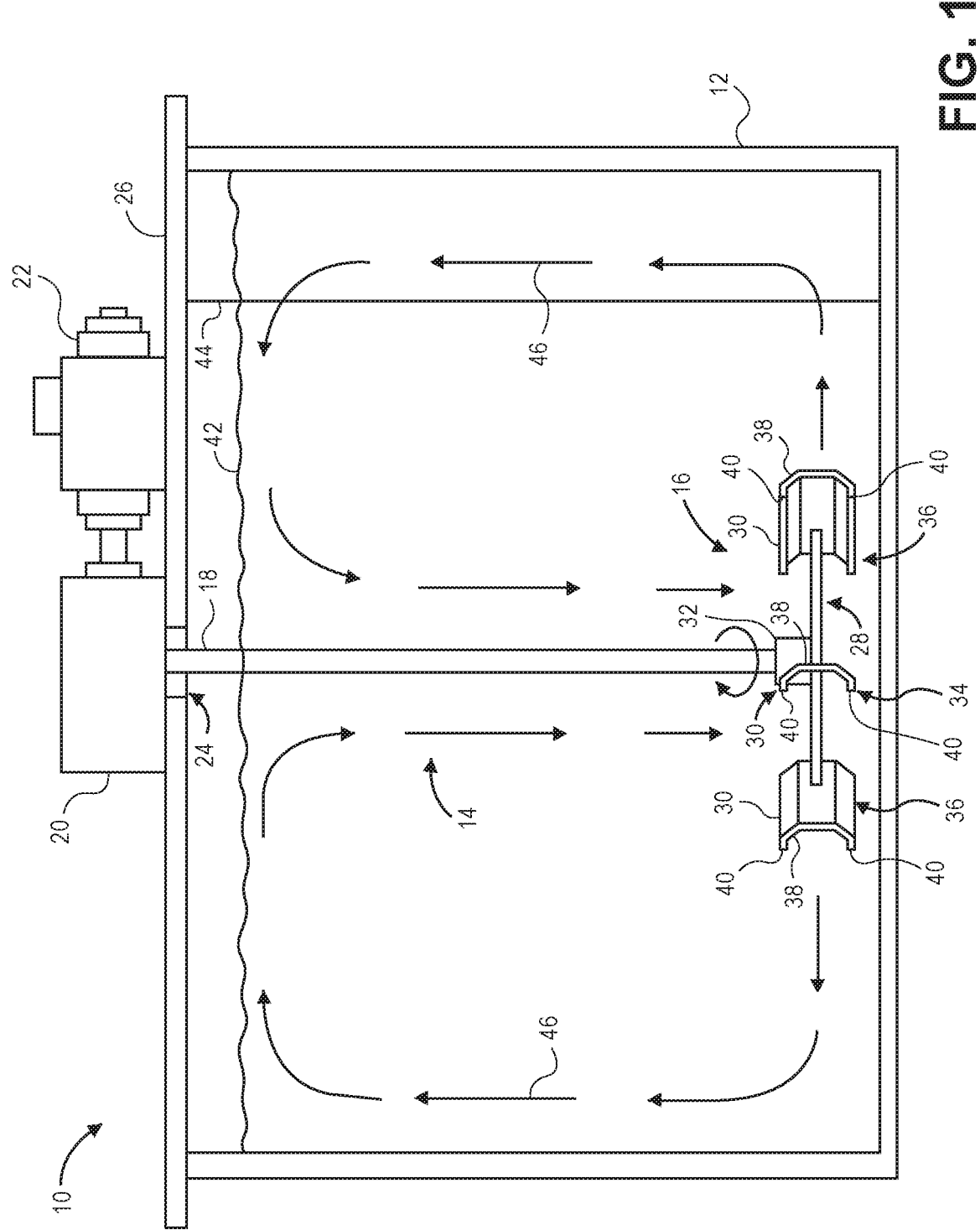
FIG. 1 is a cutaway perspective view of a radial impeller system being utilized with a container suitable for use with an embodiment.

An embodiment will now be described with reference to the drawing figures, in which like reference numerals refer to like parts throughout. FIG. 1 is a cutaway perspective view of a radial impeller system 10 being utilized with a container 12 suitable for use with an embodiment. As shown in FIG. 1, the radial impeller system 10 includes an radial impeller assembly 14. The radial impeller assembly 14 includes a radial impeller 16 and a shaft 18. The radial impeller system 10 further includes a gearbox 20, and motor 22. Alternatively, the motor 22 may directly rotate the shaft 18 and the gearbox 20 may be omitted. The container 12 includes any suitable container or vessel such as, for example, a barrel, a tank, a trough, a pipe, or the like.

In general, the motor 22 is configured to rotate the shaft 18. The shaft 18 is configured for insertion down through a port 24 in a lid 26 of the container 12. Rotation of the shaft 18 urges the radial impeller assembly 14 to rotate. More particularly, the radial impeller 16 is urged to rotate. As shown in FIG. 1, the radial impeller 16 includes a plurality of blades 30 mounted to a hub 32 via a disk 28. As shown more clearly in FIG. 2, the radial impeller 16 may include six blades 30 and in other examples, the radial impeller 16 may include two, three, four, or more blades 30.

Figure 3:
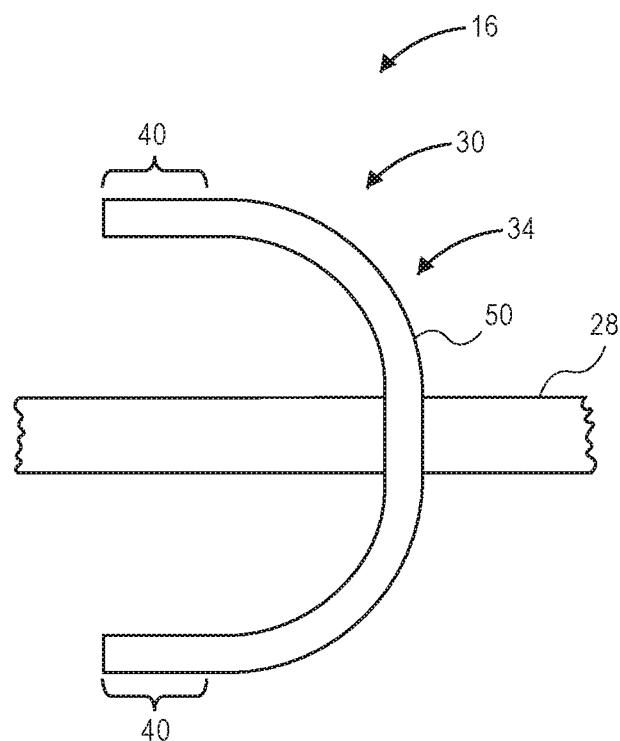
FIG. 3 is an end view of a blade suitable for the radial impeller in accordance with an embodiment.
Figure 4:
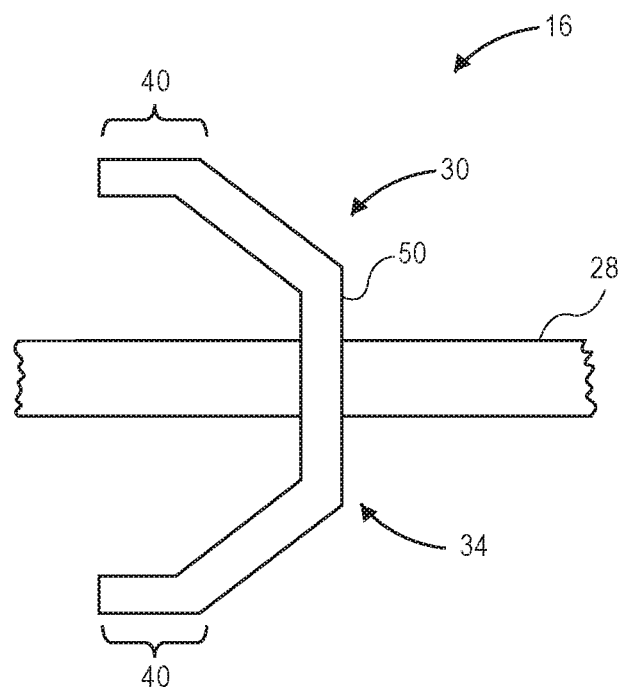
FIG. 4 is an end view of another suitable blade for the radial impeller in accordance with an embodiment.

In some aspects, the blades 30 may include a profile 34 that is generally "C" shaped when viewed edge-on. In this regard, each blade includes a root 36 secured to the disk 28 and an edge or tip 38 that is distal from the hub 32. The general "C" shape of the profile 34 may be curved (as shown in FIG. 3) and/or may include planar portions connected to each other along one or more angles (as shown in FIG. 4). In addition, the blades 30 may include horizontal extensions 40 extending from an upper and/or lower portion of the profile 34. For example, the horizontal extension 40 at the upper portion of the profile 34 extends along a plane that is parallel to a plane defined by the disk 28. Similarly, the horizontal extension 40 at the lower portion of the profile 34 extends along a plane that is parallel to the plane defined by the disk 28. Without being bound by any particular scientific theorem, it appears the horizontal extensions 40 reduce turbulence and/or cavitation of the fluid flowing around the blade 30 and therefore cause a corresponding reduction in wear. This reduced wear is particularly evident by comparing FIG. 5 to FIGS. 6 and 7.

In FIG. 1, a fluid fills the container 12 to the level shown by the wavy line 42. The container 12 may be equipped with one or more vanes or baffles 44 which extend radially from the walls of the container 12. The principal direction of the flow is radial; that is, radiating outward in a horizontal plane that coincides with a plane of the radial impeller 16. Flow is redirected by the container 12 and/or baffles 44. In particular, flow is redirected upwards along sidewalls of the container and generally proceeds in a toroidal flow as shown by the loops 46 show the direction of the total flow in the container 12, which is axially downward in the direction of pumping by the radial impeller 16 and then upward along the wall of the container 12. This toroidal flow may be facilitated by the baffle 44 that acts to constrain circular flow about the container 12. The principal radial component of the flow is obtained due to the action of the radial impeller 16. In the radial impeller system 10 shown in FIG. 1, the container 12 diameter T is approximately three times the diameter D of the radial impeller 16. The diameter D of the radial impeller 16 is defined as the diameter of the circle encompassed by the outer edge of the respective tips 38 of the blades 30. This is the D/T ratio. A ratio of 1/3 is typical for mixing devices such as the radial impeller system 10, although this can range between 1/5 and 3/5. The ratio used does not substantially affect the flow pattern inasmuch as the impeller pumps the fluid in a substantially radial direction.

Figure 2:
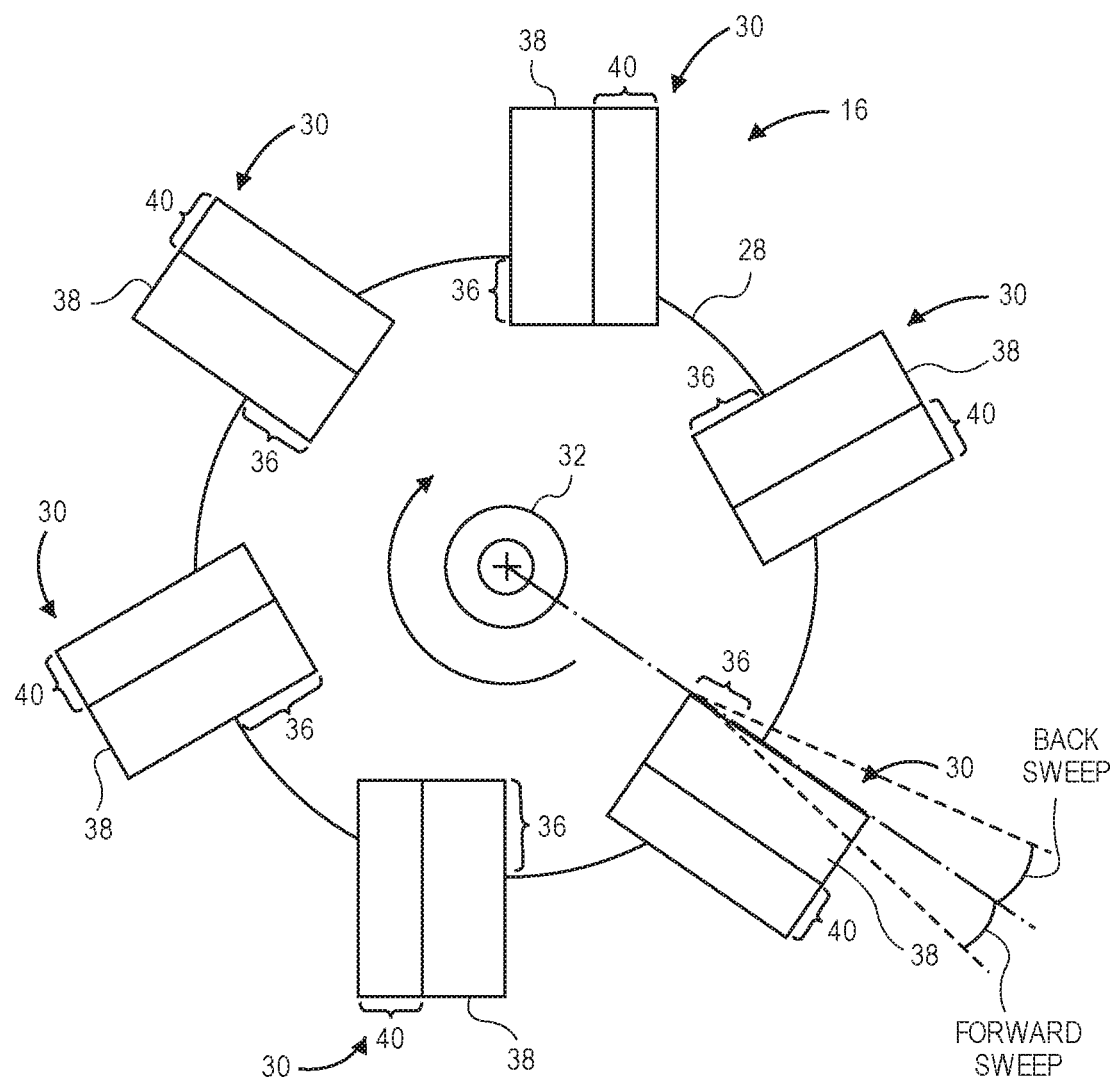
FIG. 2 is a top view of a radial impeller showing in accordance with an embodiment.

FIG. 2 is a top view of the radial impeller 16 showing in accordance with an embodiment. As shown in FIG. 2, the radial impeller 16 includes six of the blades 30 that are generally aligned radially with respect to the hub 32. In the particular example shown, about 30% of each of the blades 30 overlap and are affixed to the disk 28. In other examples, the about of overlap may range from about 10% to about 100% overlap.

Rotation of the radial impeller 16 urges fluid that is proximal to the hub 32 to flow radially out from the hub 32 and toward the respective tips 38 of the blades 30. In addition to the radial component of the flow, a circular movement of the fluid is imparted as well. In some instances, this circular flow may advantageous and the baffle 44 shown in FIG. 1 may be omitted. In other examples, to reduce the circular movement component of the flow, the baffle 44 or baffles 44 may be included.

In the example shown in FIG. 2, the blades 30 are aligned with radial lines extending from a center point at the hub 32 of the radial impeller 16. However, in other examples, the blades 30 may be angled at any suitable angle. More particularly, the blades 30 may include a forward or back sweep of ±1° to 15°.

FIGS. 3 and 4 are end views of the blade 30 with different profiles 34 suitable for the radial impeller 16 in accordance with an embodiment. As shown in FIGS. 3 and 4, the profiles 34 include the horizontal extensions 40 and a body portion 50. In FIG. 3, the body portion 50 is substantially curved. In the example shown in FIG. 4, the body portion 50 includes substantially planar segments connected along angular joints. In both examples, the horizontal extensions 40 facilitate a reduction in wear of the radial impeller 16.

Figure 5:
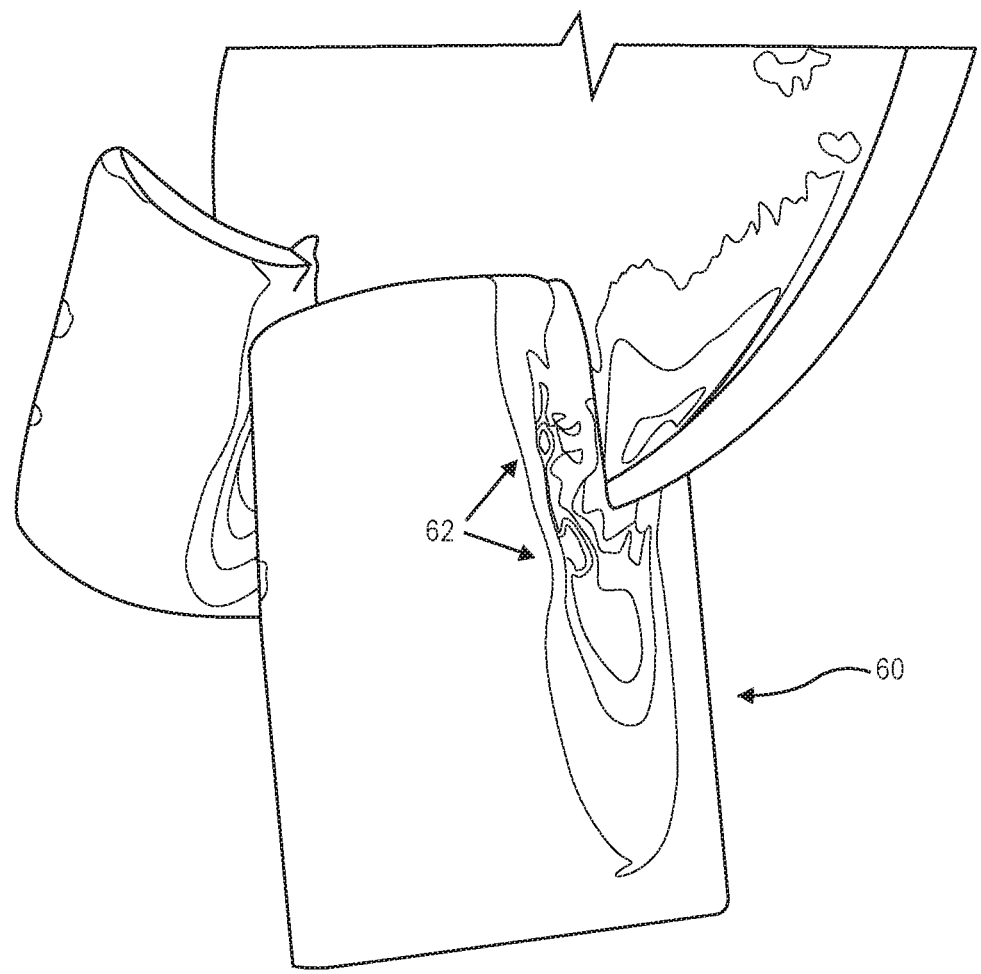
FIG. 5 is a perspective view showing wear in a prior art radial impeller.

FIG. 5 is a perspective view showing a wear pattern 60 in a prior art radial impeller. As shown in FIG. 5, the prior art radial impeller has been coated with several layers of different colored paint or similar coatings. These layers may include the same or different wear properties and the wear properties of the coatings may be predetermined in order to evaluate the wear characteristics of the various impeller conformations.

As shown in FIG. 5, the wear pattern 60 includes a relatively large portion of the prior art radial impeller (in comparison to the radial impeller 16 shown in FIGS. 6 and 7) has sustained sufficient wear that several coating layers have been removed. More particularly, the wear pattern 60 includes a plurality of extreme wear zones 62 that has penetrated five or more layers.

Figure 6:
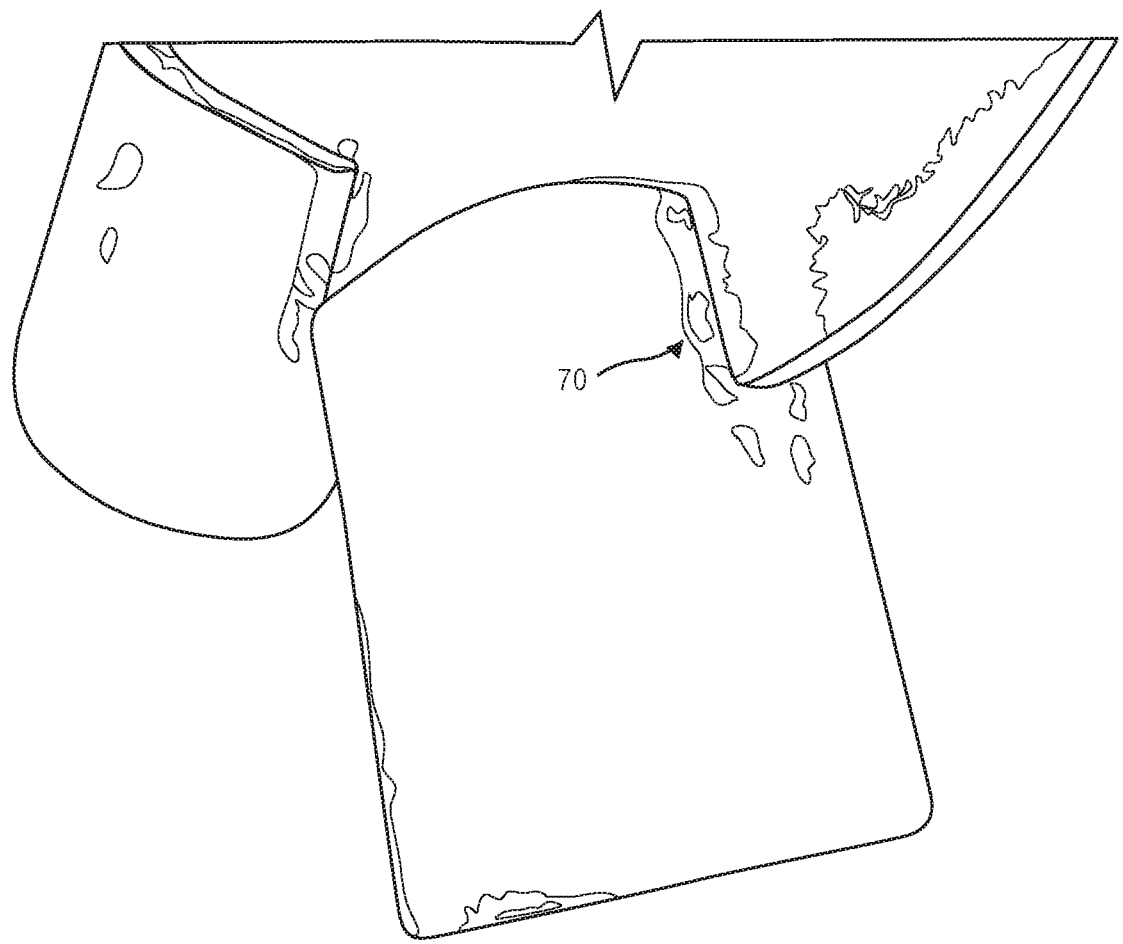
FIG. 6 is a perspective view showing wear in the radial impeller in accordance with an embodiment of the blade shown in FIG. 3.

FIG. 6 is a perspective view showing a wear pattern 70 in the radial impeller 16 in accordance with an embodiment of the blade shown in FIG. 3. As shown in FIG. 6, the size and severity of the wear pattern 70 on the radial impeller 16 is reduced as compared to the wear pattern 60 in the prior art radial impeller 16 shown in FIG. 5 and given the same operating conditions. For example, the wear pattern 70 is less than 30% the size of the wear pattern 60 and does not include any zones of extreme wear.

Figure 7:
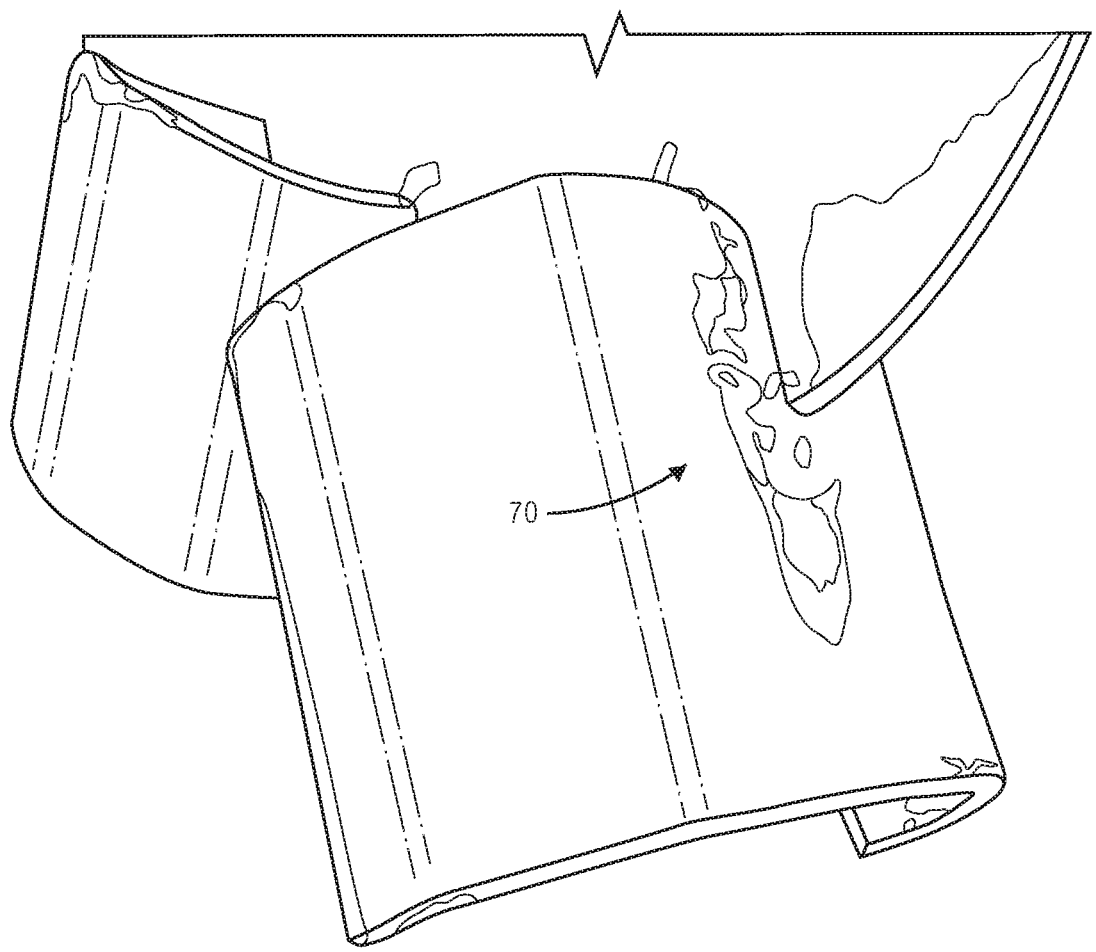
FIG. 7 is a perspective view showing wear in the radial impeller in accordance with an embodiment of the blade shown in FIG. 4.

FIG. 7 is a perspective view showing the wear pattern 70 in the radial impeller 16 in accordance with an embodiment of the blade shown in FIG. 4. As already described with reference to FIG. 6, in FIG. 7 the size and severity of the wear pattern 70 on the radial impeller 16 is reduced as compared to the wear pattern 60 in the prior art radial impeller 16 shown in FIG. 5 and given the same operating conditions. For example, the wear pattern 70 is less than 30% the size of the wear pattern 60 and does not include any zones of extreme wear.

Figure 8:
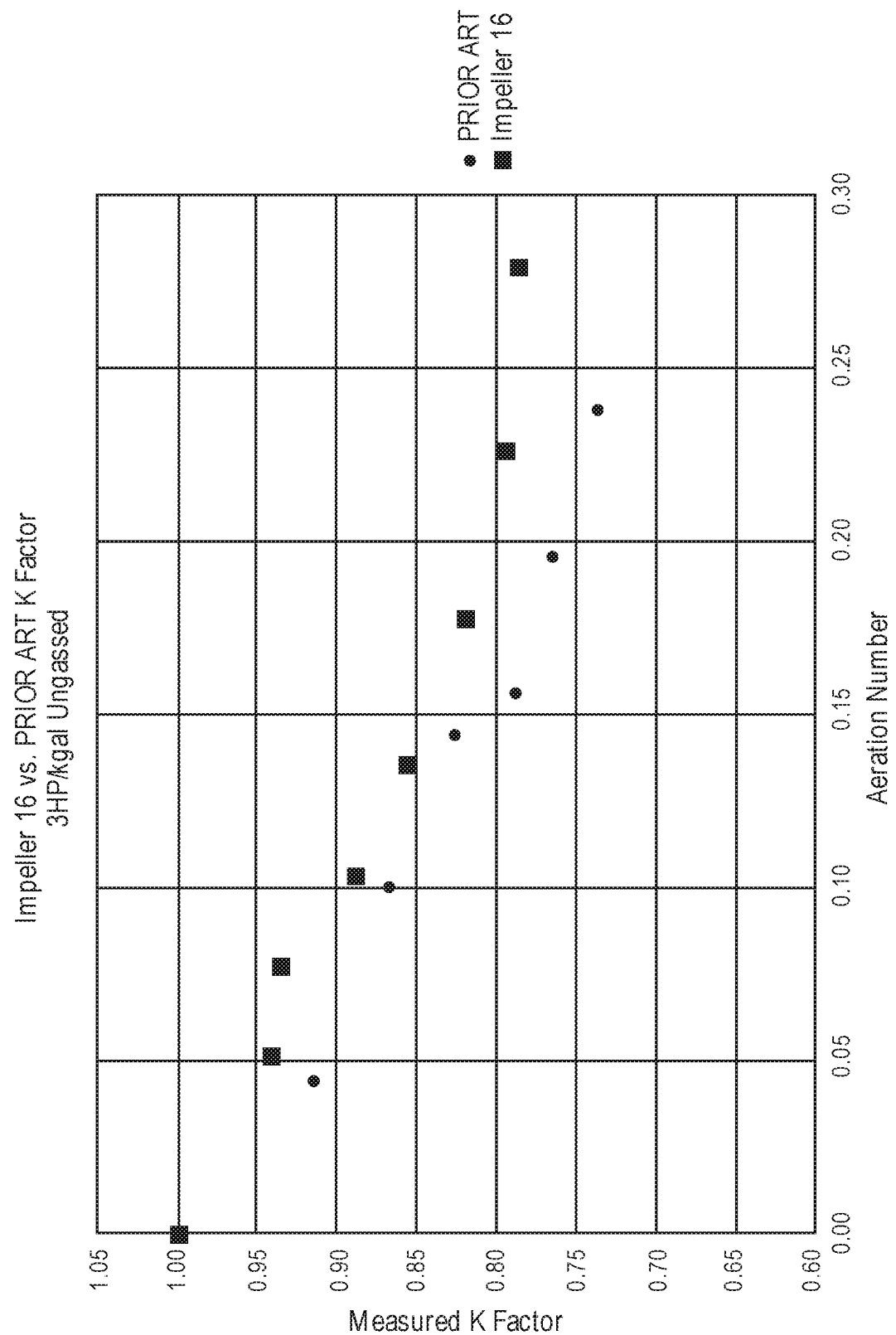
FIG. 8 is a graph showing a comparison of the gassed power response versus dimensionless gas rate of the radial impeller in accordance with the embodiment verses a prior art impeller.

FIG. 8 is a graph showing a comparison of the gassed power response versus dimensionless gas rate of the radial impeller in accordance with the embodiment verses a prior art impeller. For the purposes of this disclosure, the term, 'gassed' refers to a gas such as air incorporated into a mixture. As shown in FIG. 8, the radial impeller 16 has less of a reduction in power draw as it is gassed. This improved power response of the radial impeller 16 facilitates operation at a slower speed, relative to conventional impeller, to target the same power input as imparted by conventional impellers while still dispersing the gas in the same manner. As described herein, slower rotation corresponds to a lower tip speed (all other factors being equal) and blade wear is a function of tip speed cubed.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. A radial impeller comprising:
    a hub;
    a disk affixed to the hub, the disk having a disk plane defined by the disk; and
    a plurality of blades, each blade being affixed to the disk, wherein each blade includes:
        a "C" shaped body portion having a blade length;
        a trailing portion of the "C" shaped body portion extending along a first straight line from a root of the respective blade to a tip of the respective blade;
        an upper leading edge of the "C" shaped body portion extending along a second straight line and having the blade length;
        a lower leading edge of the "C" shaped body portion extending along a third straight line and having the blade length;
        an upper horizontal extension defined by an upper planar surface extending along an upper plane parallel to the disk plane, the upper horizontal extension having the blade length and extending along the upper leading edge; and
        a lower horizontal extension defined by a lower planar surface extending along a lower plane parallel to the disk plane, the lower horizontal extension having the blade length and extending along the lower leading edge.

2. The radial impeller according to claim 1, wherein the C shaped body portion is straight along a longitudinal axis and curved from the upper leading edge to the lower leading edge.

3. The radial impeller according to claim 1, wherein the C shaped body portion includes a plurality of planar segments connected at an angled joint.

4. The radial impeller according to claim 1, wherein each blade is connected to the disk at an overlapping portion.

5. The radial impeller according to claim 4, wherein the overlapping portion is about 10% to about 100% of the blade length.

6. The radial impeller according to claim 5, wherein the overlapping portion is about 30% the length of the blade.

7. The radial impeller according to claim 1, wherein each blade is substantially radially aligned with the hub.

8. The radial impeller according to claim 7, wherein the radial impeller includes six of the blades.

9. A radial impeller assembly comprising:
    a shaft having a first end and a second end;
    a connection to receive torque disposed at the first end; and
    a radial impeller disposed at the second end, the radial impeller comprising:
        a hub;
        a disk affixed to the hub, the disk having a disk plane defined by the disk; and
        a plurality of blades, each blade being affixed to the disk, wherein each blade includes:
            a "C" shaped body portion having a blade length;
            a trailing portion of the "C" shaped body portion extending along a first straight line from a root of the respective blade to a tip of the respective blade;
            an upper leading edge of the "C" shaped body portion extending along a second straight line and having the blade length;
            a lower leading edge of the "C" shaped body portion extending along a third straight line and having the blade length;
            an upper horizontal extension defined by an upper planar surface extending along an upper plane parallel to the disk plane, the upper horizontal extension having the blade length and extending along the upper leading edge; and
            a lower horizontal extension defined by a lower planar surface extending along a lower plane parallel to the disk plane, the lower horizontal extension having the blade length and extending along the lower leading edge.

10. The radial impeller assembly according to claim 9, wherein the C shaped body portion is straight along a longitudinal axis and curved from the upper leading edge to the lower leading edge.

11. The radial impeller assembly according to claim 9, wherein the C shaped body portion includes a plurality of planar segments connected at an angled joint.

12. The radial impeller assembly according to claim 9, wherein each blade is connected to the disk at an overlapping portion.

13. The radial impeller assembly according to claim 12, wherein the overlapping portion is about 10% to about 100% of the blade length.

14. The radial impeller according to claim 13, wherein the overlapping portion is about 30% the length of the blade.

15. The radial impeller assembly according to claim 9, wherein each blade is substantially radially aligned with the hub.

16. The radial impeller assembly according to claim 15, wherein the radial impeller includes six of the blades.

17. A radial impeller mixing system comprising:
a container having an access port disposed on an upper surface thereof;
a motor; and
a radial impeller assembly comprising:
a shaft having a first end and a second end;
a connection to receive torque from the motor, the connection being disposed at the first end; and
a radial impeller disposed at the second end, the radial impeller comprising:
a hub;
a disk affixed to the hub, the disk having a disk plane defined by the disk; and
a plurality of blades, each blade being affixed to the disk, wherein each blade includes:
a "C" shaped body portion having a blade length;
a trailing portion of the "C" shaped body portion extending along a first straight line from a root of the respective blade to a tip of the respective blade;
an upper leading edge of the "C" shaped body portion extending along a second straight line and having the blade length;
a lower leading edge of the "C" shaped body portion extending along a third straight line and having the blade length;
an upper horizontal extension defined by an upper planar surface extending along an upper plane parallel to the disk plane, the upper horizontal extension having the blade length and extending along the upper leading edge; and
a lower horizontal extension defined by a lower planar surface extending along a lower plane parallel to the disk plane, the lower horizontal extension having the blade length and extending along the lower leading edge.

18. The radial impeller mixing system according to claim 17, wherein the C shaped body portion is straight along a longitudinal axis and curved from the upper leading edge to the lower leading edge.

19. The radial impeller mixing system according to claim 17, wherein the C shaped body portion includes a plurality of planar segments connected at an angled joint.

20. The radial impeller mixing system according to claim 17, wherein each blade is substantially radially aligned with the hub.

* * * * *